April 16, 1940.　　　　G. FLEISCHEL　　　　2,197,301
VARIABLE SPEED AND AUTOMATICALLY DRIVEN TRANSMISSION
Filed Sept. 23, 1935　　6 Sheets-Sheet 3
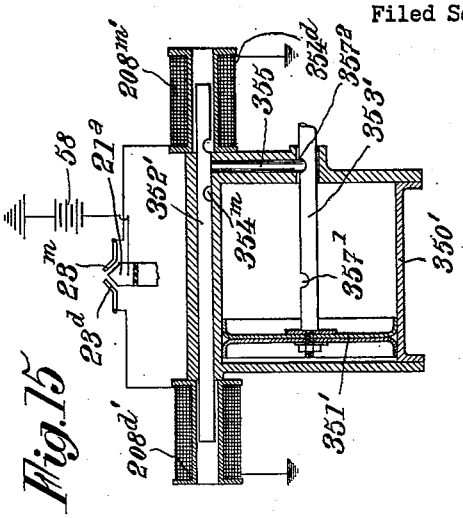
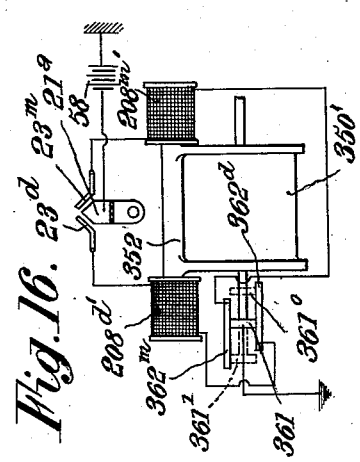
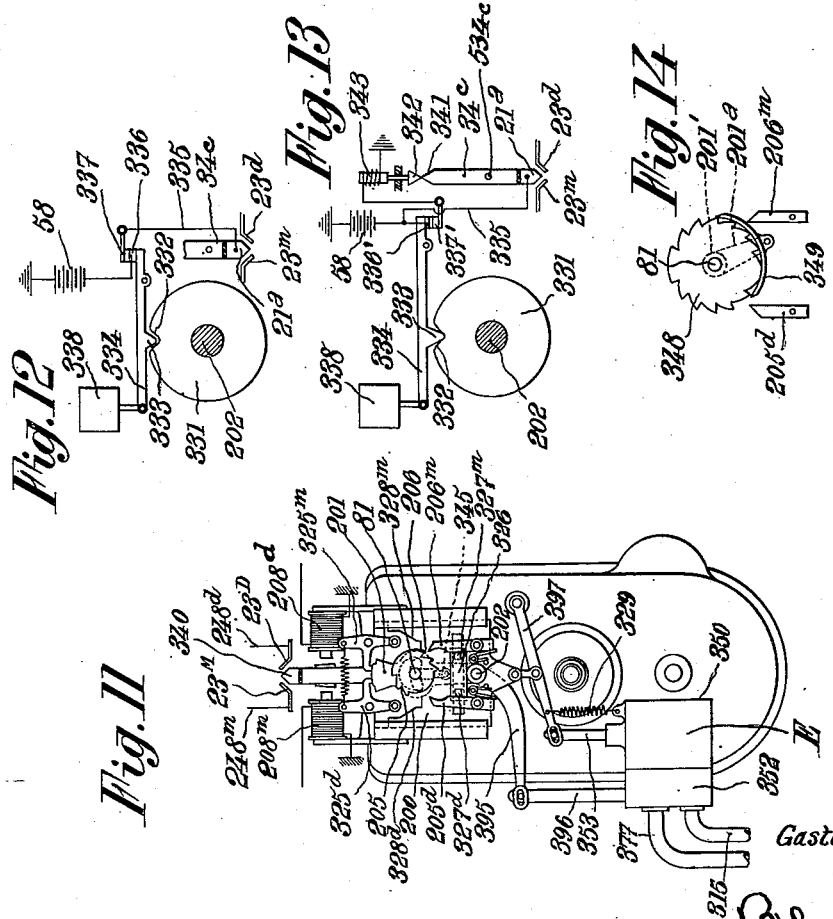
Inventor:
Gaston Fleischel
Attorneys:

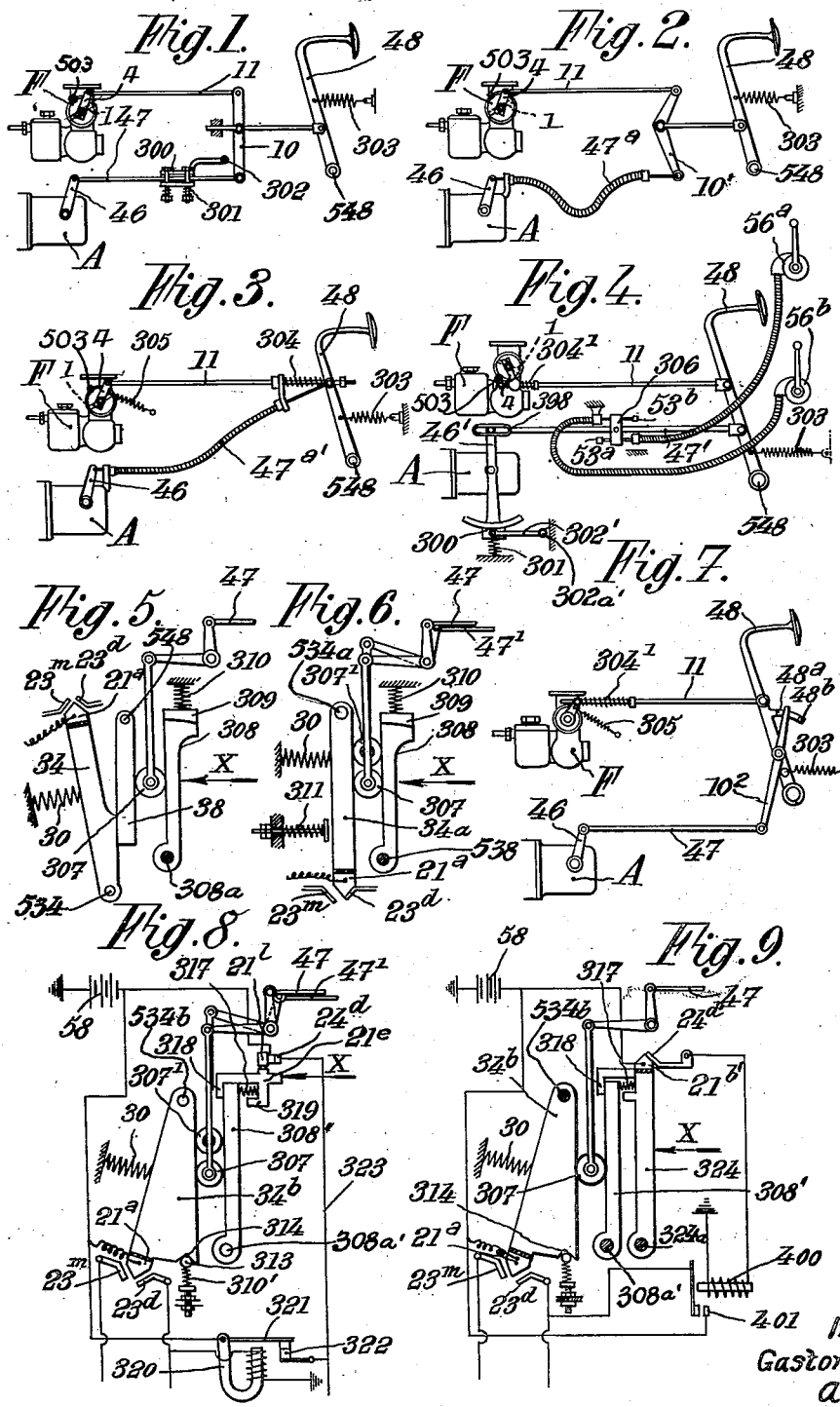

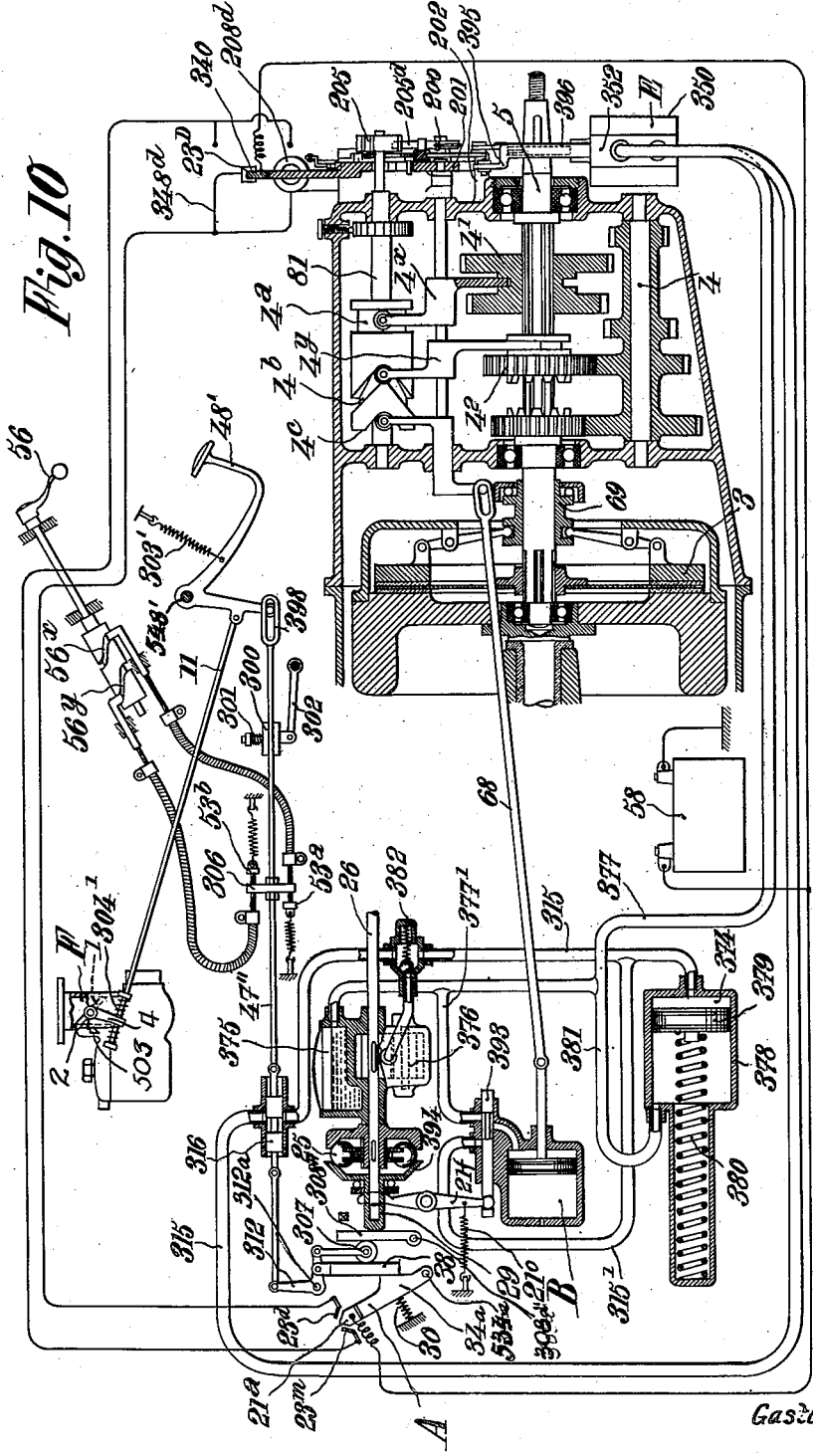

April 16, 1940.  G. FLEISCHEL  2,197,301
VARIABLE SPEED AND AUTOMATICALLY DRIVEN TRANSMISSION
Filed Sept. 23, 1935  6 Sheets-Sheet 4
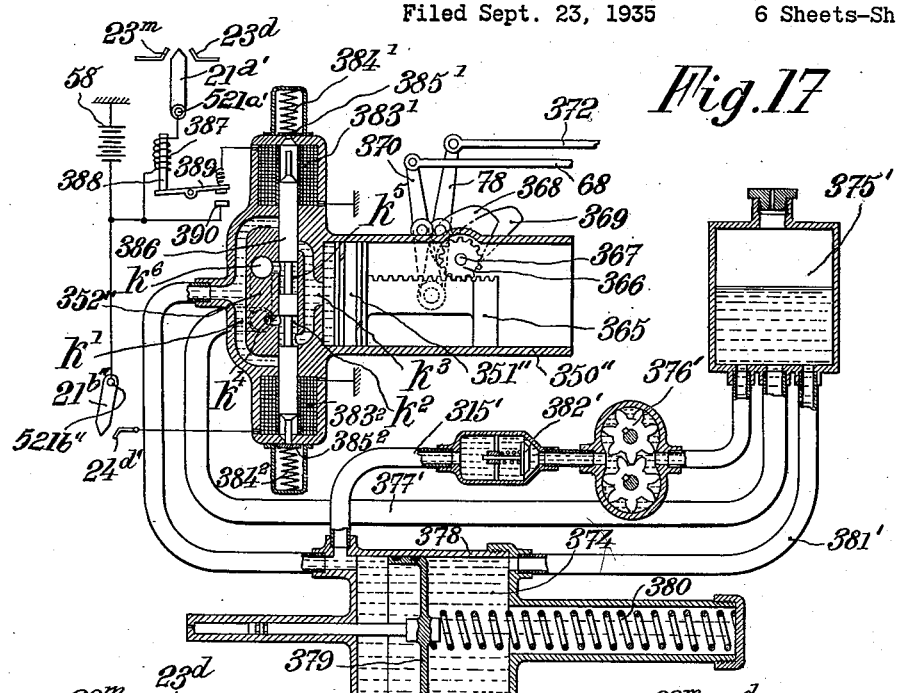
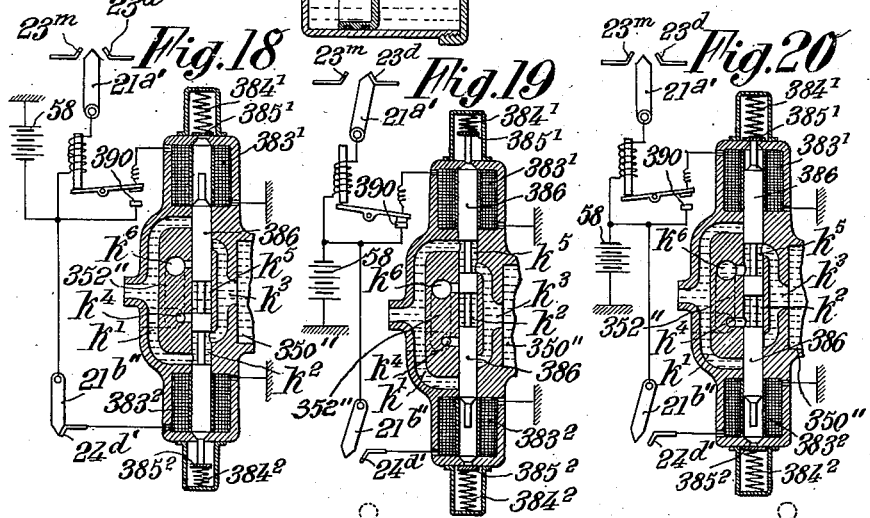
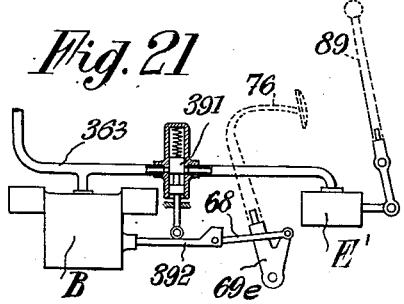
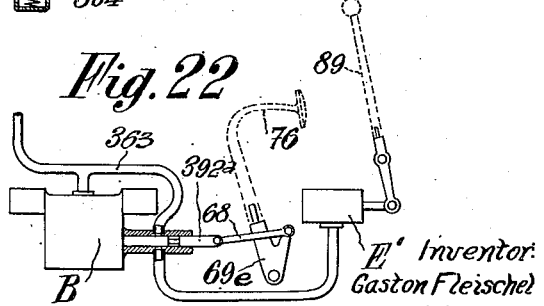
Inventor:
Gaston Fleischel
Attorneys
Bailey & Pearson

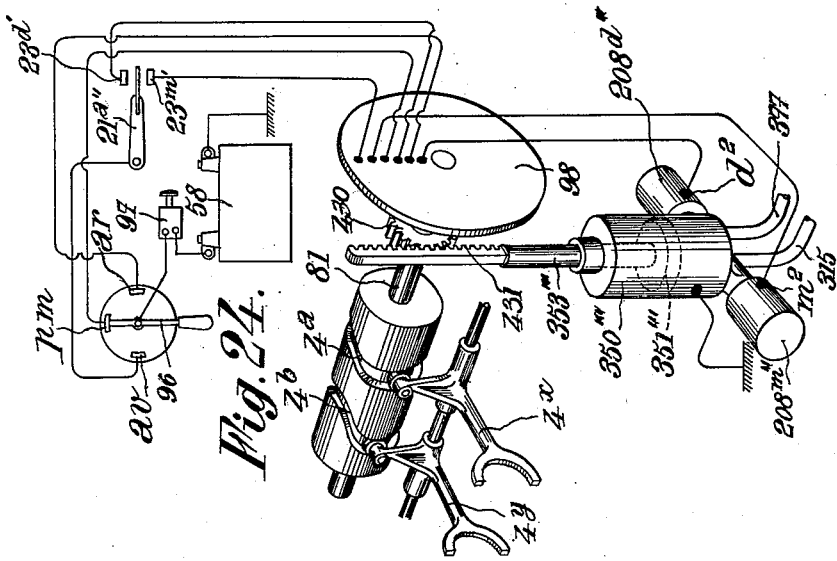
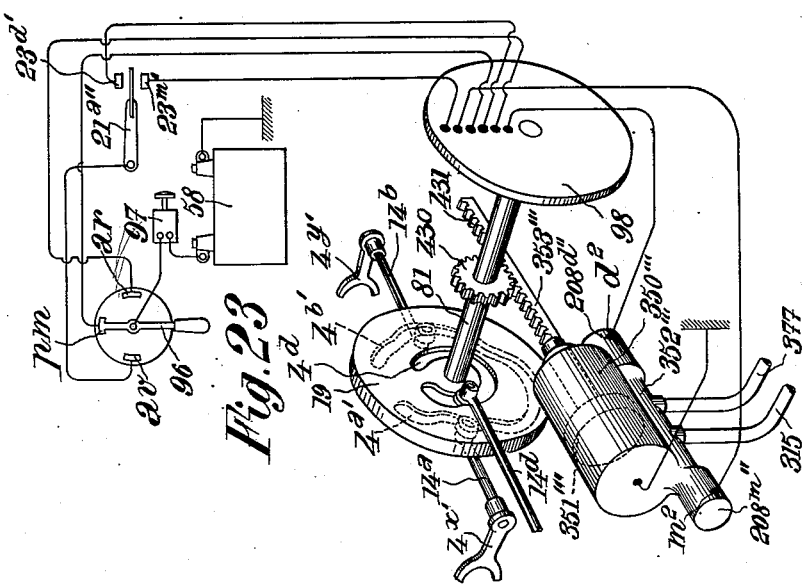

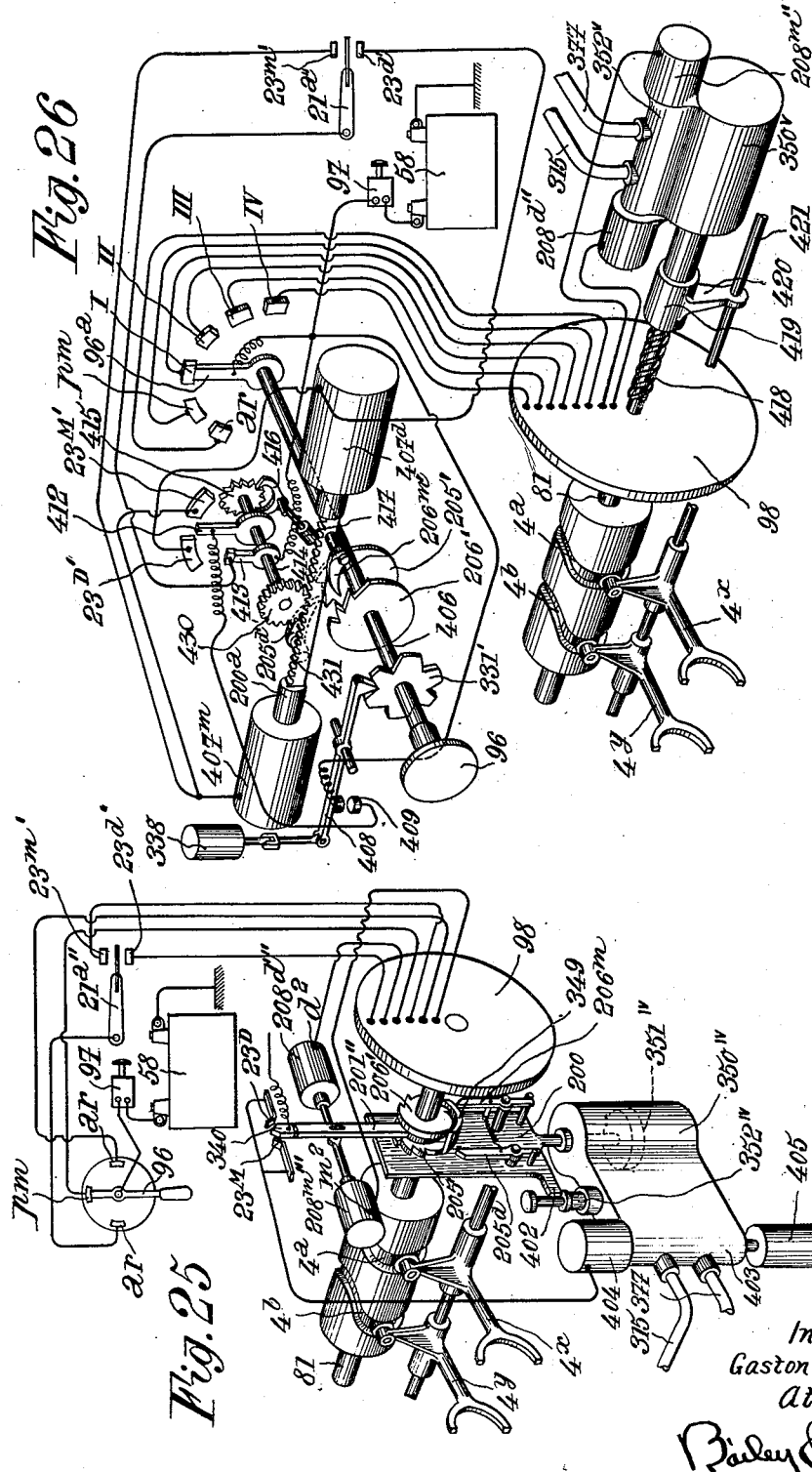

Patented Apr. 16, 1940

2,197,301

UNITED STATES PATENT OFFICE 2,197,301

VARIABLE SPEED AND AUTOMATICALLY DRIVEN TRANSMISSION

Gaston Fleischel, Bleneau, France

Application September 23, 1935, Serial No. 41,813
In France September 28, 1934

28 Claims. (Cl. 192—.01)

This invention relates to variable speed transmissions and particularly to variable speed transmissions of the type used in connection with internal combustion motor driven vehicles.

The general object of the present invention is to provide improvements in variable speed and automatic control transmissions, and especially in transmissions for automobile vehicles, of the type described in my U. S. Patent application, Ser. No. 691,388, filed September 28, 1933.

A first object is the assembly of structure adapted to be actuated by a single control member. A second object is to co-relate the single control member with the feed of fuel to the engine and with the clutch or release device. Yet another object is to co-relate the structure such that the desired actions may take place in an order which can be chosen at will.

A further object of the invention is to devise the arrangement in such a manner that by means of a single mechanism it is possible to obtain both a constant variation effect of the forces acting on the control members of the clutch and transmission and a variation which is constantly or variably proportional to the force which is exerted.

A further object of the invention is to provide a device in which the forces acting on the control members are substantially invariable through a certain range, which range may be controlled so as to vary its extent.

Still another object of the invention is to provide an arrangement in which forces act both on the clutch control element and on the transmission control member, such forces being transmitted from each member to the other, and means being provided for preventing operation of the transmission control member until the clutch control element has been moved to a position to engage the clutch.

These and other objects of the present invention will be seen to be embodied in or result from the operation of the structure, a detailed description of some specific embodiments of which follows.

Preferred embodiments of the present invention appear in the accompanying drawings, given merely by way of example, and in which:

Fig. 1 shows in elevational view one embodiment of the fuel feed and transmission control actuating structure;

Fig. 2 is an elevational view of a second embodiment of that part of the invention shown in Fig. 1;

Fig. 3 is an elevational view of a third embodiment of the same;

Fig. 4 is an elevational view of a fourth embodiment of the same.

Fig. 5 shows diagrammatically in elevational view a device with variation arrangements according to the invention;

Fig. 6 shows a second embodiment of a device shown in Fig. 5.

Fig. 7 is an elevational view of another embodiment of the arrangement shown in Figs. 1 through 4.

Fig. 8 shows diagrammatically in elevational view a release mechanism in accordance with the invention.

Fig. 9 shows a second embodiment of the release mechanism.

Fig. 10 shows diagrammatically in longitudinal partly sectional view the whole of the transmission according to the invention.

Fig. 11 is a rear elevational view of the transmission shown in Fig. 10.

Fig. 12 is a diagrammatic elevational view of a safety device to be used in combination with structure as shown in Figs. 10 and 11.

Fig. 13 is a second embodiment of such safety device.

Fig. 14 shows a modification of the ratchet and pawl arrangement shown in Fig. 11.

Fig. 15 is an axial sectional view of one embodiment of a servo-motor in accordance with the invention.

Fig. 16 is an axial sectional view of a different embodiment of the same.

Fig. 17 is a longitudinal sectional view of a fluid operated servo-motor for the control of a transmission according to the invention.

Figs. 18, 19, and 20 are sectional views showing the distribution device of Fig. 17 in three different positions.

Fig. 21 is a side view partly in section of a system in which two servo-motors are used for control of various parts.

Fig. 22 is a side view of a different embodiment of the same.

Fig. 23 is a diagrammatic elevational view of a servo-motor and rack for changing the gear ratio.

Fig. 24 is an elevational view of a different embodiment of the same.

Fig. 25 shows a third embodiment of the same, and;

Fig. 26 shows a fourth embodiment of the structure shown in Fig. 23.

In various figures of the prior United States patent application, Ser. No. 691,388, filed September 28, 1933, Patent No. 2,092,446, September 7, 1937, above referred to, there was described a device permitting the driver to displace, through a pedal or the like, an equalizer which acts, on the one hand, upon the engine fuel feed control and on the other hand, through a rod 47 for instance, upon an active and movable element of the system of the release devices for operating the gear box, letting in the clutch and disengaging the clutch, these two actions being either consecutive or overlapping, or again simultaneous.

With the arrangement disclosed by this prior patent application, the driver can, by depressing the pedal, open first the fuel feed device, for instance the throttle valve of the carburetter and then act on the release devices. When the pedal is released, the actuated parts are returned to normal position in reverse order.

Now, in most circumstances, it is advantageous that the order of return to initial position, should be the same as when said pedal is depressed. This result can be obtained, according to the present invention, for instance as shown in Figs. 1 to 7, in which the carburetter or equivalent part is designated by F and the system of release mechanisms by A.

In the embodiment of Fig. 1, rod 47 is subjected to the action of a motion retarding device, which may be positive, of the limited action kind, etc. This device consists, for instance, of two braking jaws or shoes 300, provided with adjusting springs 301, and fixed at 302. The braking effect is adjusted in such manner that the displacement of rod 47 requires a stronger effort than the displacement of rod 11. A spring 303 acts on pedal 48 pivoted at 548 for bringing the whole of the parts into their initial position when the driver ceases to depress pedal 48.

When the driver depresses pedal 48, he first opens the throttle valve 1 or equivalent element of carburetter F, because the braking action on rod 47 is adjusted in such manner that said rod 47 remains stationary as long as said throttle valve 1 is not fully opened (in which position it is stopped by its usual abutment 503). By further depressing the pedal, the effort of the driver is transmitted to rod 47. It then overcomes the resistance of braking device 300, bearing upon the abutment 503 of the carburetter, and rod 47 is displaced in turn.

When the driven ceases to depress pedal 48, rod 11, which is freer than rod 47 (the latter being subjected to the action of the braking device 300) moves in a backward direction until the throttle valve 1 or the like comes into contact with the abutment 2 corresponding to the fully closed position. Then rod 47 is in turn moved, under the effect of the pull of spring 302.

If it were desired, that the movement of rod 47 should start, in either direction, before rod 11 is stopped by the abutment 503 or 2 of the carburetter, it is sufficient to make use of an equalizer 10' of V shape, with a determined angle at the apex. The variations of the equalizer resulting from rotary movements of the latter when rod 11 moves will compensate for the resistance of brake 300 before rod 11 reaches its extreme position, in which it is stopped by an abutment 2 of the carburetter.

I may also, as shown by Fig. 2, replace rod 47, together with its braking device 300, by a transmission 47a including a metallic cable adapted to slide in a flexible sheath. In this case, the friction between the cable and its sheath is adjusted by imposing more or less sharp bends on said transmission.

Fig. 3 shows another arrangement including a flexible transmission 47a', in which pedal 48 acts on rod 11 through a spring 304 of a tension sufficient in order that pedal 48 may move the throttle valve or the like of the carburetter until said throttle valve is in contact with the abutment corresponding to the full opening thereof, after which said spring 304 can be compressed when the driver further depresses pedal 48. The free end of sheath 47a' is fixed to a suitable point of rod 11 and the free end of the cable of the transmission device is fixed to pedal 48.

If the driver depresses pedal 48, he first fully opens the fuel feed device and transmission 47a' follows the movement of the pedal, this transmission being somewhat deformed, but without producing any relative displacement of the cable with respect to the sheath, therefore without any movement of the lever 46 of release device A. When rod 11 is stopped at the end of its stroke, because full rate of feed is obtained, the action exerted on pedal 48 produces, if it is pursued, a compression of spring 304 and an action upon release device A, due to the movement of the cable with respect to its flexible sheath, which is now fixed in position. If care is taken to render the internal frictions between the cable and the sheath of the transmission higher than the expansion action of spring 304 when the pedal is brought back into its initial position by the action of its spring 303 and of an auxiliary spring 305, the rod 11 of carburetter F is actuated as soon as the pedal starts moving upwardly, without any relative displacement of the cable with respect to the flexible sheath of transmission 47a' taking place. This transmission 47a' therefore reassumes its initial shape and it is only when rod 11 is stopped at the end of its stroke that the cable of flexible transmission 47a' can move with respect to its sheath, under the action of spring 304 and spring 303, thus causing the release device to act on mechanism A, until the pedal has come back into its initial higher position.

In Figs. 4 and 10 I have shown another embodiment, including no equalizer, in which pedal 48 (or 48' pivoted at 548') is directly attached, on the one hand to the connecting rod 11 through which the carburetter is controlled, and, on the other hand, to the rod 47' or 47" which acts on release device A. This rod 47' or 47" is provided with a slideway 398, of a length such that it corresponds substantially to the total stroke of rod 11 when it is desired that the operations should not overlap. The connecting lever 46', Fig. 4, is subjected to the action of a braking device, including for instance a shoe 300' carried by lever 302' pivoted at 302a' and acted on by spring 301', in such manner that the action of this device does not interfere with the displacement of the slideway. Rod 11 is subjected to the action of a device 304[1] elastic in two opposite directions, in order that the abutments of the throttle valve of the carburetter F should not oppose the supplementary displacement that must be imparted to pedal 48 or 48' for actuating the connecting element 46 or 312.

As shown in Fig. 7, pedal 48 operates the carburetter in the same manner as in Fig. 4. However, if a return spring 305 is provided, it suffices to cause a single spring 304[1] to act on rod 11.

To pedal 48 is articulated an equalizer bar 10² one end of which is connected through rod 47 with the release device A. The free end of said equalizer bar 10² can come into contact with a heel 48ª carried by pedal 48. The time at which these two parts come into contact with each other when the pedal is depressed can be chosen to correspond to any position whatever of the pedal. Owing to the provision of spring 304¹, the operating lever 46 of the release device can move through the whole of its stroke, even if the throttle valve of the carburetter is stopped by its abutment 3 because, in this case, spring 304¹ is compressed as much as it is desired. It will be readily understood that the throttle valve or equivalent member of the carburetter can be displaced as under ordinary conditions as long as pedal 48 has not reached a predetermined position toward the left hand side of Fig. 7, without lever 46 being moved in the same direction, since the equalizer bar 10² pivots about the articulation provided between parts 47 and 10². It is only when equalizer bar 10² comes into contact with projection 48ª that the whole device acts as if the equalizer bar was rigid with the pedal and only then is rod 47 driven. When pedal 48 is moved upwardly, if lever 46 has been provided with a brake, there is obtained first the closing of the carburetter while equalizer bar 10¹ pivots about its articulation, and, at the end of the upward stroke of pedal 48, equalizer bar 10² and rod 47 drive lever 46 of the release device A, by bearing upon the other stop 48ᵇ of pedal 48.

In my prior U. S. patent application above mentioned, there was disclosed a cam-shaped means to act as a double stop for the movable lever corresponding to lever 46 of the present application. Various shapes of this cam obviously may be used in connection with the present structure.

I may also, as shown by Fig. 4, provide, on either side of a piece 306, rigid with rod 47, two stops 53ª and 53ᵇ, controlled, from a distance by operating handles 56ª and 56ᵇ, respectively, which may be locked in any position, chosen by the driver. In some cases, a single stop of variable position may be sufficient, the other stop being adjustable once and for all or being stationary, or even being dispensed with. Instead of providing manual control means, I may also provide, for the stop or stops, automatic controlling means, for instance membranes or pistons on which the variable suction of the engine can act.

Fig. 10 shows another modification of this arrangement, according to which the flexible or rigid transmissions which control stops 53ª and 53ᵇ lead to two grooves or cams 56ˣ and 56ʸ, provided in a piece capable of being moved with an angular (or translatory) movement by means of a single operating handle 56. The shape of grooves 56ˣ and 56ʸ is determined by the law that is to be imposed to the displacements of the stops.

In my prior U. S. patent application above referred to, it was shown that it is necessary to include, in any control mechanism for non-progressive variable speed transmissions, devices, which will be hereinafter called "variation devices," which are intended to compensate, by a stabilizing or braking effect, for the disturbance that the sudden variation in the working conditions of the engine resulting from the changing of gears in the gear box would necessarily produce in the equilibrium of the forces in presence in the mechanism of the release device or devices. This relates, for instance to the equilibrium between a centrifugal force X (Fig. 6) developed by a centrifugal governor (not shown) and the action of a spring 30, acting in opposition to said force X. As explained in my prior patents, force X may be the resultant of actions more complicated than that of a centrifugal governor, but this does not in any way modify the explanations that will be given hereafter.

Among the "variation devices" proposed by me, some have a uniform or constant action, that is to say always keep the same value, whatever be the magnitude of the forces in presence (X and spring 30). Such a variation device consists for instance of a friction brake or an elastic bolt urged by a spring. Other "variation devices" have an action which may be variable, being for instance proportional to the magnitude of the forces in presence. Among variation devices of this kind I may cite the system consisting of two overlapping levers 34—38, pivoted at their opposed ends at 534 and 538.

It should be noted that the characteristics of a "variation device," either of the uniform action type or of the variable action type, also depend upon the position that it occupies in the mechanism A of the release devices. In these devices, there always act, on the one hand a variable force X (or a resultant of variable forces) produced by the functional factors that are brought into play, and, on the other hand, a constant or uniform force, such as that exerted by a spring 30, for instance. In Fig. 10, for instance, this force 10 is produced by centrifugal governor 25 and transmitted, through push-piece 29, to the system of levers 34—38.

Now, in this mechanism A, there exists generally an element to which it is advantageous to transfer, when the gears are being changed in the gear box, the equilibrium between the variable force and the uniform force. In Figs. 5, 6, 8, 9 and 10, this element is the movable roller 307, the displacements of which are, in point of fact, intended to vary the lever arms through which the variable force acts, in such manner as to give it a value such that it can, within the limits of the working of the device, be caused to balance the constant force of spring 30.

Between this element 307 and spring 30, there is no variation of force if the action of the "variation device" is not taken into account. Therefore, if it were desired to obtain a theoretically accurate result, it would be necessary (if the "variation device" were disposed between force X and roller 307) that this "variation device" should have a proportional effect in order that its action should follow the variation of variable force X.

If, on the contrary, the "variation device" is located between roller 307 and spring 30, it will suffice to make use of a constant effect "variation device" since, on this side of the roller, the forces are constant.

But, in actual practice, I have found that the theoretical "variation device" gives no stability to the apparatus and that it is necessary to adopt a "variation device" the effect of which is slightly greater than that of the theoretical "variation device." Furthermore, the stability may advantageously be made variable with the working conditions of the gear box.

According to the invention, these results can be easily obtained by providing a "variation device" having a part of the characteristics of a constant action "variation device" and/or a part of the characteristics of a variable or proportional action "variation device" (Figs. 5 and 6) or again by modifying, in a suitable manner, the effect of a proportional action "variation device," as shown by Fig. 10.

Finally, the same result might be obtained by adding to movable roller 307 another roller 307¹ with manual or automatic control 47¹ distinct from the control 47 of roller 307, as shown in the embodiments of Figs. 6 and 8.

In the embodiment of Fig. 5, the "variation device" consists, as in the prior application above mentioned, of two levers 34 and 38 overlapping each other and pivoted at their opposite ends respectively. Lever 34 is also provided with a heel 21ᵃ connected to a source of electricity and which, according as it comes into contact with a stud 23ᵈ or 23ᵐ (according as the strength of spring 30 or force X is preponderant, as explained in detail in the prior U. S. patent application above mentioned) produces a change to a higher or lower gear combination.

307 is a roller, controlled by rod 47, which was referred to in the description of Figs. 1 to 4, and which therefore constitutes, in this case and by way of example, the movable element of the mechanism A of the release devices. Said roller is simultaneously in contact with lever 38 and with a third lever 308, pivoted, at 308ᵃ, at the end thereof opposed to that at which lever 38 is pivoted, said lever 308 being subjected to the action of force X (or the resultant of the forces).

While the overlapping of levers 34 and 38 constitutes a "variation device" of the proportional action type, both due to its structure and due to its location between roller 307 and spring 30, I combine with such a device a constant action "variation device" consisting for instance of a braking or friction shoe 309 urged by a spring 310 and applied against a heel of lever 308.

It will be readily understood that, according to the value given to the tension of spring 30 and to the length along which the levers 34 and 38 overlap each other, wholly different effects are obtained, to which is also added the influence of the position given to roller 307 by rod 47.

In Fig. 6 I have shown a similar arrangement, but in which, instead of having recourse to a proportional action "variation device" obtained by an overlapping of levers 34 and 38, there is provided a single lever 34ᵃ pivoted at 534ᵃ and urged by a spring 30 and which, when it is in one of its extreme positions, is applied against contact 23ᵈ corresponding to changing to a lower gear. On the contrary, before the heel 21ᵃ of lever 34ᵃ can come into contact with contact 23ᵐ (corresponding to changing to higher gear), it must compress a second spring 311, thus forming a "variation device" which is of the constant action type by its structure but of the proportional action type by its location. To this device there may also be added a constant action "variation device" (frictional element 309 with spring 310) which, by being placed between roller 307 and force X on the part that transmits variable forces, introduces a non-proportional effect into the system.

In Fig. 10, I have shown another arrangement of this kind, but with a single "variation device" of the variable proportional action type. In this case, the effect of this "variation device" is varied, for instance correspondingly with the displacements imparted to the movable element, to wit roller 307, which acts on lever 308" pivoted at 308ᵃ", by rod 47. For this purpose, lever 38 is no longer jointed to a fixed part of the system but to a lever 312 pivoted at 312ᵃ, for instance an L-shaped lever, which controls the displacements of roller 307 and which is pivotally connected to the rod 47 of the preceding embodiments. The overlapping of levers 34 and 38 is thus modified in accordance with the position of roller 307 (or of rod 47") which, consequently, destroys the proportionality of the effect of "variation device" 34ᵃ—38. I thus obtain a working analogous to that in which a constant action "variation device" is added, as in the embodiments illustrated by Figs. 5 and 6.

Figs. 8 and 9 show another embodiment according to which the single lever 34ᵇ is urged by the opposing spring 30, by roller 307 acting on lever 308' and by a constant action "variation device," consisting of a ball or a roller 313, subjected to the action of spring 310', the strength of which is carefully chosen, said ball engaging a notch 314 provided in lever 34ᵇ. This notch might be replaced by a projection, if heel 21ᵃ were not to have a neutral position between contacts 23ᵈ and 23ᵐ.

Figs. 6 and 8 further show the action of a second roller 307¹ identical to roller 307. In this way, I can by varying the interval between these two rollers, adjust the width of the zone of stability thus obtained. As a matter of fact, the adjustment of the distance between these rollers produces for the working of the device exactly the same effect as the adjustment of the length along which levers 34 and 38 overlap each other in the embodiments of Figs. 5 and 10. But the movement necessary for moving said rollers with respect to each other is considerably facilitated by the rolling displacement of said rollers along the surface against which they bear.

In the prior U. S. patent application above referred to and in the preceding description, I have continuously been referring to "release devices" which, as already explained in detail, are automatic control mechanisms operative by variable forces as a function of the working conditions of the engine (and/or of the vehicle) and which, in combination with at least one antagonistic spring, decide and produce the intervention of an energy, different from the manual action of the driver, for producing the automatic and desired operation of the gear box and, eventually, of the gear mechanism provided between the driving shaft and the gear box. The energy necessary for these operations may be supplied by a source of electricity. It may also be supplied by the pressure or the suction of a fluid (either liquid or gaseous) by bringing into play "servo-motors" or the like and the operation of which is controlled, either directly or indirectly, (for instance through electrical means) by the mechanisms which have been designated by the generic term of "release devices."

According to the specific cases, there may be provided a release device for controlling the gear box and another release device for controlling the main clutch if the latter exists. These mechanisms may also be combined together so as to form a single mechanism having certain parts in common. Furthermore, a difference may be made between the release device which causes the clutch to be let in and an auxiliary mechanism which controls the disengagement of said clutch. These various considerations were explained, described and claimed in detail in the prior U. S. patent application above mentioned.

Concerning the servomotors, I may provide, on the one hand, a special servo-motor for the operation of the control device of the gear box, this servo-motor eventually serving also to the operation of the main clutch when changing gear, and, on the other hand, an independent servo-motor which operates the main clutch only during the periods of starting and stopping the vehicle, since it is well known that this last mentioned operation of the clutch takes place under conditions wholly different (and in particular much more slowly and gradually) from those under which the clutch is caused to operate when changing gears.

In the following description, I will first disclose some modifications, according to the present invention, concerning the release devices which have over the devices described in my prior U. S. patent application above referred to, several advantages. These devices will be described by referring more particularly to Figs. 5, 6 and 8 to 10.

In Figs. 5 and 6, the force X (or the resultant of the forces that are made use of) acts on a lever 308, in opposition to the action of a spring 30, the system of levers having been already described above. One of these levers, for instance that designated by reference character 34 or 34$^a$, carries a conducting part 21$^a$ electrically insulated from the remainder of the mechanism and connected to a source of electricity (not shown). This conducting part 21$^a$ is capable of moving between two contacts 23$^m$ and 23$^d$, connected respectively to control or distribution system of a servo-motor or equivalent device, adapted to operate the gear box, and eventually the main clutch.

When force X overcomes the action of spring 30, lever 34 or 34$^a$ leaves its intermediate or inoperative position and it comes into contact with element 23$^m$, which brings into action the servo-motor, changing to a higher gear combination. This produces a reduction of the value of force X and lever 34 or 34$^a$ comes back to its inoperative intermediate position while the vehicle is being driven with a new gear combination. When the action of spring 30 overcomes that of force X, lever 34 or 34$^a$ pivots in the opposite direction and its conducting portion 21$^a$ touches contact 23$^d$, which produces the operation of the servo-motor in such manner as to change to a lower gear, after which lever 34 or 34$^a$ comes back into its inoperative position.

In Fig. 8, I have shown an example of a release device for the gear box combined with a release device for the main clutch mechanism.

In this case, the force X does not act directly upon lever 308', pivoted at 308$^{a\prime}$, as in the embodiments of Figs. 5 and 6, but on a sliding element 21$^e$ which bears upon said lever 308' through a spring 317 and, if necessary a projection 318. This sliding element 21$^e$ carries a contact 21$^b$ connected to a source of electricity 58, which can feed current to a contact 24$^d$ connected to the servo-motor, for the operation of the clutch, in order that said servo-motor may let in the clutch or disengage it.

If the force X is zero or is insufficient due to the engine being stopped or running at a speed lower than that for which the main clutch (or its equivalent) can be let in, the active element 21$^e$ of the clutch release device, pushed by spring 317, closes the feed circuit 323 of contact 24$^d$, so that the main clutch is disengaged. On the other hand, the lever 34$^b$ pivoted at 534$^b$ and contact 21$^a$ of the gear box release device, under the thrust of spring 30, is applied against contact 23$^d$, which controls the servo-motor associated with the gear box, for the automatic changing to a lower gear, which, in the present instance, is the first gear.

When the engine is running and the speed for which the clutch can be let in is reached, the force X reaches a value for which spring 317 yields until a projection 319 of the sliding element 21$^e$ comes into contact with lever 308'. At the same time, said element 21$^e$ leaves contact 24$^d$, which permits the letting in of the clutch and the drive of the vehicle through the first gear combination.

As soon as an equilibrium is reached between force X and spring 30, lever 34$^b$ comes into neutral position, for which the drive of the vehicle still takes place through the first combination of gears. If force X becomes too great, the electricity conducting portion 21$^a$ of lever 34$^b$ is applied against contact 23$^m$ which corresponds to changing to a higher gear. I therefore obtain a working analogous to that described with reference to Figs. 5 and 6.

The clutch release device may be completed by providing it with means for choosing, as value of the speed at which the letting in of the clutch takes place, the variable speed for which the gear box release device 21$^e$ causes changing to a lower gear and not, as above stated, the constant value of the speed for which force X is sufficient for compressing spring 317.

For this purpose, it suffices to connect contact 23$^d$ (corresponding to changing to a lower gear) with a relay 320, for instance an electromagnetic relay, which, as long as the active element 21$^a$ is applied against contact 23$^d$, attracts a movable blade 321, connected to the electric source 58 and causes it to touch contact 322, preventing the letting in of the main clutch (although contact 24$^d$ is released) until, due to an increased speed of the engine, contact 23$^d$ is no longer fed with current. In this case, the letting in of the clutch varies with the working conditions of the gear box, while the disengagement of the clutch takes place for a working speed determined by contact 24$^d$. Of course, I might, if necessary, render variable the point at which the clutch is disengaged.

Fig. 9 shows a modification according to which the active element 21$^b$ is carried by a lever 324 urged by force X and oscillating about a fixed point 324$^a$, adjacent the pivot 308$^a$ of lever 308'.

It may be desirable, in some cases, to produce the automatic changing to the lowest gear when, due to an insufficiency of the speed of revolution of the engine, the clutch is disengaged when the vehicle is standing still. I then connect the contact 24$^d$, when it is fed by the contact 21$^{b\prime}$ of the clutch release device, with a small relay 400 which, when it is fed with current at the same time as 24$^d$, closes the contact 401 provided between source 58 and the contact 23$^d$ of lever 21$^a$.

With this arrangement, contact 23$^d$ is fed with current by the release device 21$^{b\prime}$ every time the latter disengages the clutch, which causes changing into lower gear. But, on the contrary, when contact 23$^d$ normally produces changing into lower gear, the disengaging of the clutch is not influenced.

The same result might be obtained by doubling contact 24$^d$.

In Fig. 10, I have shown a clutch release device and a gear box release device in a form which is less diagrammatic than that shown by the preceding figures.

It has been assumed, by way of example, that the gear box is provided with sliding gears while the main clutch 3, is, for instance, of the friction type. The sliding gears, such as 4¹ and 4² (or the clutch means through which gears constantly in mesh could be keyed on the respective shafts) are respectively controlled, for instance, by cams 4ᵃ and 4ᵇ carried by a main control shaft, located above box 4, or laterally with respect thereto. Shaft 81 may occupy several characteristic angular positions which correspond respectively to the gear combinations to be considered, for instance four different combinations corresponding to forward drive under the control of a servo-motor E hereafter described. These cams control forked levers 4ˣ and 4ʸ adapted to slide along a common spindle, which transmit the movements to gears 4¹ and 4². On shaft 81 there is also keyed a cam 4ᶜ which serves to operate the control sleeve 69 (sliding sleeve) of clutch 3, said cam including as many projections as there are different gear combinations and each projection serving to disengage the clutch when passing from a gear combination to the immediately higher or lower gear combination.

On the contrary, during the periods of starting or stopping the vehicle, the control sleeve 69 is actuated by a servo-motor B, which will also be hereafter described. In order that the two systems for controlling the clutch may not interfere with each other, the connecting rod with servo-motor B is provided with a slideway.

The mechanism A above described acts, on the one hand, on the active projection 21ᵃ of the gear box release device, which controls, through electric means, the operation of the reciprocating motion servo-motor E, for instance operated by means of a fluid (oil) under pressure and through which motion is transmitted to rotary shaft 81, for controlling the gear box 4 and the clutch 3, when passing from one gear to another one. This mechanism A actuates, on the other hand, an active element 21ᵇ of the clutch release device which controls, for instance directly, the distribution device 393 of a reciprocating motion servo-motor B, for instance of the same type as servo-motor E, and fed by the same fluid, in order to control the operation of clutch 3 during the periods of starting and stopping of the vehicle.

The engine drives a shaft 26 which, on the one hand, is adapted to drive an oil compressor 376, for instance a gear pump, and, on the one hand, drives a centrifugal governor 25, consisting for instance of big balls disposed between the conical elements of a cage in such manner as to push before them sliding member 394, provided with a push piece 29 which transmits force X, above referred to, to mechanism A.

This member 394 acts directly on the distribution device 393 of servo-motor B, bringing this distribution device into the position, shown by Fig. 10, in which the speed of shaft 26 is supposed to have become sufficient for permitting the letting in of the clutch. Distribution device 393 is therefore in the position in which it stops the inlet conduit 315¹ for the fluid under pressure coming from compressor 376 and opens the conduit 377¹ leading to an oil reservoir 375. This permits the piston of servo-motor B to come into the position toward the right hand side of Fig. 10, corresponding to the letting in of the clutch. When lever 21ᶠ is further driven by part 394, slide valve 393 moves toward the right hand side of Fig. 10, without modifying the flow of fluids.

During this operation, the first gear is in action. It is only when clutch 3 is fully let in that push piece 29 can come into contact with the lever 38 of the gear box release device. When the speed of revolution of the engine has become sufficient for changing to the second gear combination, push piece 29 applies the active projection 21ᵃ of the gear box release device, against the action of spring 30, onto contact 23ᵐ, which as hereinafter explained, produces the operation of servo-motor E for changing into second gear. The distributing slide valve 393 of servo-motor B still occupies the position corresponding to the letting in of the clutch, but this does not interfere with the disengagement thereof under the effect of cam 4ᶜ, while changing from first to second gear (or changing from any gear combination to the next gear combination) owing to the provision of a slideway at the end of connecting rod 68.

It is only when the speed of revolution of the engine and of shaft 26 has become insufficient, which produces the backward displacement of part 394, that lever 21ᶠ is acted upon by its return spring 21ᵒ, driving the distributing slide valve 393 together with it. Said valve therefore clears the opening of the inlet conduit 315¹ for the fluid under pressure and closes the opening of the exhaust conduit 377¹, whereby the piston of servo-motor B moves toward the left hand side of Fig. 10 and causes the clutch to be disengaged.

Concerning the servo-motor E intended to operate the rotary control shaft 81, it consists, for instance of a reciprocating motion engine 350, actuated by means of oil under pressure which, advantageously, is supplied by the same compressor 376, for instance an oil pump, which feeds oil to servo-motor B. Eventually, there is provided, in conduit 315, which connects said pump to the distributing device 352 of servo-motor E, a check valve 382. Another conduit 377 brings back to reservoir 375 the oil from servo-motor E. An arrangement of the same kind is also shown by Fig. 17.

Advantageously, I provide, between compressor 376 and distribution device 352, a reserve of oil under pressure supplied by an accumulator of energy including, for instance, a cylinder 378 in which is movably fitted a piston 379, constantly urged toward the right hand side by a spring 380 of suitable strength.

In case of an excess of oil fed from the compressor, said oil fills the accumulator, compressing spring 380. In the opposite alternative, the oil under pressure, discharged by spring 380 from the accumulator, is added to that fed by compressor 376. In this case, it is advantageous to provide, between the cylinder 378 of the accumulator, behind piston 379, and reservoir 375, an auxiliary conduit 381, whereby the oil present in this space can replace that discharged by compressor 376 into chamber 374, located on the other side of said piston 379, without the total volume of oil being modified, which makes it possible to use a reservoir 375 of smaller size.

In order to transform the translatory motion of piston 351, which moves in the cylinder 350 of servo-motor E, into an angular movement, in either direction, I may make use of the arrangement which is more particularly disclosed by Figs. 10, 11 and 25.

For this purpose, I connect piston 351, for instance through an oscillating arm 397 provided with a return spring 329, with a plate 200 which follows the displacements of said piston, being suitably guided, for instance along its lateral edges. This plate is arranged to slide along a piece 201 capable of pivoting about a spindle 202 carried by the casing of the gear box and on which piece 201 there is fixed an arm 395 which, through a rod 396, acts on the distribution system 352 of servo-motor E.

On plate 200 can also slide transversely a small carriage 326 capable of being driven by a lug 345 carried by piece 201. This carriage carries two projections 327$^m$ and 327$^d$ which also move together with piece 201 toward the right hand side and the left hand side of Fig. 11. In the course of these displacememts, these projections cause, or allow, pawls 205$^d$ and 206$^m$ to oscillate in corresponding directions.

Shaft 81, which extends through plate 200 and piece 201, carrying a ratchet wheel having oppositely directed teeth 205 and 206 (or, as in Fig. 25, two separate wheels 205' and 206') which cooperate respectively with the pawls 206$^m$ and 205$^d$ mounted on plate 200.

The upper end of the oscillating piece is engaged between two electro-magnets 208$^m$ and 208$^d$ respectively connected with contacts 23$^m$ and 23$^d$ cooperating with the active element 21$^a$ of the gear box release device.

When this active element, under the effect of mechanism A, is pivoted in such manner as to come into contact with contact 23$^m$, the coil of electro-magnet 208$^m$ is energized and it attracts the upper end of piece 201 which pivots about the axis 202, toward the left hand side of Fig. 11. Due to this movement, piece 201 drives small carriage 326 in the same direction and both pawls 205$^d$ and 206$^m$ are also inclined toward the left hand side of the figure. Therefore, pawl 205$^d$ is moved away from the corresponding ratchet wheel 205 and pawl 206$^m$ is brought below the teeth of wheel 206, in a position in which it is ready to cooperate therewith.

The inclination of the oscillating piece 201 also serves to bring the distribution device 352 of servo-motor E into a position in which the fluid under pressure is introduced through 315 into cylinder 350 whereby the piston 351 of the servo-motor is driven upwardly, transmitting this movement to sliding plate 200. As pawls 205$^d$ and 206$^m$ are carried by this plate, pawl 206$^m$ is caused to act on ratchet wheel 206 and thus rotates shaft 81 into its new characteristic position, this corresponding to changing to the next higher gear.

When, due to the changing from one gear to the next one, the active element 21$^a$ of the gear box release device A has come back into its intermediate or inoperative position, the energizing of coil 208$^m$ ceases, oscillating piece 201 comes back into its intermediate position, the pawls again assume their initial inoperative position, the distribution device is brought back into a position for which the liquid under pressure can escape through conduit 377, and the piston 351 of servo-motor E comes back into its lower position, same as plate 200 under the action of spring 329.

A similar operation would be obtained if the active element 21$^a$ were brought into contact with element 23$^d$. This would have energized coil 208$^d$, causing oscillating piece 201 to pivot toward the right hand side of Fig. 1, and the pawls to pivot also in this direction, the distribution device 352 being brought into a position in which electro-motor E operates. I thus obtain, through the action of pawl 205$^d$ on ratchet wheel 205, a rotation in the opposite direction of shaft 81 and the changing to a lower gear. When the operation of changing from a gear combination into another one is completed the various parts come back into the initial position as above explained.

Instead of making use of ratchet wheels 205 and 206 which are distinct, I may, as shown by Fig. 14, replace these ratchet wheels by a single wheel 348, keyed on shaft 81, if the amplitude of the movement is smaller. Furthermore, I fix on piece 201', through an arm 201$^a$, a hiding plate 349, disposed against the teeth of the wheel in such manner as to hide the teeth against which pawl 205$^d$ or 206$^m$ is not to act and, on the contrary, to leave free the teeth which must be driven by one or the other of these pawls. As piece 201 is driven from the start of the operations, it is quite certain that this plate will occupy, at the required time, the proper position.

The same result could be obtained by means of a hiding element consisting of a solid sector associated with wheel 348 and having a radius equal to the radius of said wheel. This sector does not interfere with the teeth on which one of the pawls is to act and it is applied against the teeth of the wheel that must not be touched by the other pawl. In this case, the pawls are given a width sufficient in order that they may overlap both the toothed wheel 348 and the solid sector.

It results from the explanations given above that servo-motor E can ensure, under the control of release mechanism A, the operation of the gear box 4, through shaft 81 and cams 4$^a$ and 4$^b$ and that of the main clutch 3, through the same shaft 81 and cam 4$^c$, when changing from one gear to another one.

According to the present invention, the device further includes means through which any error of the automatic mechanisms is made impossible.

For this purpose, I make use of means whereby the orders given by the mechanisms are, so to speak, controlled, these controls preventing the execution of another order as long as the first one has not been fully performed. In this way, not only is it impossible for another order to interfere with the execution of the first order (which, as a matter of fact, would be quite exceptional) but also any order which has started being executed is performed right to the end, even if the release device which has transmitted this order leaves the corresponding contact before the order is wholly executed.

In most cases, the servo-motor is brought into operation by a distribution device, this word designating in a very general way the element which, being influenced by the system which decides the operation (either release device or the driver) causes, either directly or indirectly, the servo-motor to be brought into operation or into inoperative position.

The control of the orders can be performed by special devices or by making use of the distribution system of the servo-motor. It then suffices to immobilize, until the end of the desired operation, the distribution device or a particular device interconnected therewith in the position which causes the servo-motor to execute this order and to release, either directly or indirectly, the distribution device only when the operation is wholly performed.

If, for instance, the release device closes electric circuits, as in the embodiment of Fig. 10, and as above explained, I may displace the distribution device of the servo-motor through electromagnetic apparatus fed, when desired, with current from the release device. As soon as an order has displaced the distribution device and has brought it into the corresponding position, it is immobilized, for instance by a locking element which prevents any counter order by maintaining the distribution device in its active position as long as the order has not been fully executed. Once this is performed, and only then, the locking element is released at the end of the stroke of the servo-motor and the distribution is brought back into its inactive, or inoperative, position for instance by means of a spring.

The same result is obtained by feeding with current, in a suitable manner, the electromagnetic apparatus which are intended to displace the distribution device. This forced feed is ensured in such manner as to release the distribution device only after full execution of the order, thus constituting a kind of electric locking.

I may then, by way of precaution, cut off the action of the release device during the execution of each operation in order that it should not interfere with the said electric locking action.

Eventually, the release device may be brought back into operation only a certain time after the end of each operation in such manner as to be quite sure that the release device shall not interfere before all the results of the operation to be performed are fully obtained.

Finally, I may provide, on the distribution system of the servo-motor, an auxiliary contact which, same as this distribution system, is locked while each operation is being performed and replaces, during this time, the contact of the release device which has been rendered inoperative.

Hereinafter I have described some examples of these safety arrangements.

As shown by Fig. 11, piece 201 is provided with two projections provided on either side of this piece and intended to cooperate with locking members 325$^m$ and 325$^d$ respectively. When piece 201 pivots, for instance toward the left hand side of Fig. 11 by being attracted by electro-magnet 208$^m$, locking member 325$^m$, pushed by a spring, engages behind the corresponding projection, which prevents the return of piece 201 and also that of the distribution device into its intermediate position before the operation has been fully performed. This is due to the fact that, after the engagement above described, the active organ 21$^a$ can no longer modify the operation until plate 200 has been moved upwardly to a sufficient distance, under the action of electro-magnet E, in order that an inclined surface 328$^m$ or 328$^d$ provided on the sliding plate, may move the corresponding locking member away from oscillating piece 201, so as to disengage the latter. At this time, of course, the operation of the control shaft 81 is finished.

In Fig. 12, I have shown an arrangement permitting to eliminate the influence of the release device during the execution of an order but after its beginning. I fix on axis 202, connected as in Figs. 10 and 11 to the distribution device 352 of the servo-motor E, a cam 331 which includes a notch 332 in which engages a projection 333 when said shaft 202 is in its neutral position. This projection is provided on a lever 334, pivoted about a fixed point, and carrying a contact 336 which, for this position, is applied against a contact 337 closing the feed circuit 335 of the active element 21$^a$ (which is mounted on lever 34$^c$) of the release device A.

As soon as shaft 202, and together with it the oscillating piece 201, has left its neutral position, rotating in one direction or in the opposite one, circuit 335 is, consequently, cut off. This arrangement avoids any possibility of premature breaking of the feed from the release device, as long as the order that has been given has not been executed.

It may be desirable that the feed of the release device 21$^a$ should be reestablished only a certain time after shaft 202 has come back into its neutral position, which may be obtained by causing to act on lever 334 a braking device or dash-pot 338, which delays as much as necessary the return of said lever into its initial position, after the operation has been performed. The time for which the circuit of the release device is cut off can thus be adjusted in a very accurate manner.

It should be noted that lever 334 might also be devised in such manner as to be displaced not by shaft 202 but by sliding plate 200, so that, during the forward stroke it is compelled to move together with said plate while, during the return stroke, it is delayed by a device such as that designated by reference number 338 in Fig. 12.

The oscillating piece 201 (Fig. 11) may be provided with a contact 340, for instance in the shape of a wedge, which cooperates with contacts 23$^M$ and 23$^D$ connected through wires 348$^m$ and 348$^d$ with contacts 23$^m$ and 23$^d$ of the lever 21$^a$ of the release device, for confirmation or repetition of the order transmitted through said lever 21$^a$. The contact thus made and which constituted the electric locking above mentioned, can in turn be maintained owing to locking member 325$^m$ or 325$^d$, when piece 201 is inclined in one direction or the other.

Instead of providing these supplementary contacts, I might also, as shown by Fig. 13, immobilize the lever 34$^c$ pivoted at 534$^c$ and carrying contact 21$^a$ of the release device directly, during and even after the execution of the order than has been given.

For this purpose, I connect the conducting end 21$^a$ of the lever 34$^c$ of the release mechanism A to the electric source 58 and one end of lever 34$^c$, for instance the end opposite to that carrying part 21$^a$, forms a sharp ridge 341. In line with this ridge, when the lever is in its intermediate position, there is provided a similar sharp ridge 342 which an electro-magnetic device 343 can cause to move forward when current is fed to its coil in consequence of the closing of circuit breaker 336'—337'.

As soon as the release device transmits an order, lever 34$^c$ pivots in one direction or in the other, closing contact 23$^m$ or 23$^d$ and the two sharp ridges cease to be in line. As soon as the order starts being executed, the contact is closed at 337' and the plunger of the electro-magnetic device moves forward in such manner that one of the sides or flanks of the sharp ridge 342 bears upon the flank of the other ridge, which locks lever 34$^c$ and the conducting portion 21$^a$ thereof in the position corresponding to the order to be executed. When the operation is finished, lever 334 comes back into the initial position and the plunger can come back by itself to its initial position, the flanks of the sharp ridges losing contact with each other. A dash-pot 338 may delay this disengagement of release device 21$^a$.

The devices as above described may be carried out with distribution organs of any kind whatever, whatever be the energy that is utilized for operating the servo-motors.

Fig. 15 shows a reciprocating motion servo-motor, operated by a fluid under pressure, or at a pressure lower than atmospheric pressure and consisting essentially of a cylinder 350', a piston 351', and a slide valve 352' which, when it occupies its mean position, is inoperative, and which, for one and the other of its extreme positions, controls the inlet and the exhaust of the driving fluid in any suitable manner (not shown in the drawings).

The ends of said slide valve form two magnetic cores which cooperate respectively with the coils 208ᵐ′ and 208ᵈ′ the energizing of which is controlled by the cooperation of lever 21ᵃ with its contacts 23ᵈ and 23ᵐ.

When slide valve 352' occupies either of its extreme positions, one of the notches 354ᵈ or 354ᵐ with which it is provided is located opposite a rod 355 housed radially in one of the ends of cylinder 350' and intended to play the part of the locking member or members, such as 325ᵐ of the preceding examples. Rod 355 is of a length slightly greater than the distance between the outer wall of slide valve 352' and the rod 353' of the piston. If piston 351' reaches one of the ends of its stroke, it brings a notch 357' under rod 353', which can then be disengaged from notch 354ᵈ or 354ᵐ and release the distribution device. The latter then comes back to its initial or intermediate position owing to the action of return springs (not shown in the drawings) for which position piston 351' is in turn locked, as shown by Fig. 15, by rod 355, while the slide valve remains free to follow the orders transmitted from the release device 21ᵃ.

Fig. 16 shows an arrangement permitting, for instance in a servo-motor 350' of the kind of that described with reference to Fig. 15, to have the action of the release device or the auxiliary contacts on the slide valve and its electro-magnets 208ᵐ′ and 208ᵇ′ controlled by the position occupied by the rod 353' of the piston of the servo-motor.

It is desired, in this example, to cancel the order of the release device or of the auxiliary contacts that would tend to repeat an operation already performed, while leaving a different operation perfectly free to be performed.

It is assumed, by way of example and merely in order to facilitate the explanations, that when the release device or the auxiliary contacts close contact 23ᵐ′, coil 208ᵐ′ is fed with current in such manner as to move slide valve 352' toward the left hand side of Fig. 16 and that this movement of the slide valve produces the displacement of the piston in the same direction.

It is desired to cut off the feed of this coil 208ᵐ′ as soon as the piston has come into the required position.

For this purpose, I provide, in line with the rod 353' of the piston, or in connection therewith, a double switch consisting for instance of a conducting surface 361 connected to the metallic frame of the vehicle, which, for all intermediate positions of the piston, is in contact with two rods 362ᵐ and 362ᵈ to which are connected the circuits of coils 208ᵐ′ and 208ᵈ′. However, the length and the position of these rods are such that, once at the end of its stroke, conducting element 361″ ceases to be in contact with one of these rods, for instance rod 362ᵐ, and, at the other end of said stroke, with rod 362ᵈ.

When the piston, after executing an order reaches the end of its stroke, for instance toward the right hand side of Fig. 16, contact 361, which is now in position 361⁰, cuts off the circuit of coil 208ᵐ′, which has just carried out this order, while the circuit corresponding to the inverse order remains closed. It follows that the execution of an order involves the impossibility of a further consumption of current. For the displacement of contact 361 toward its position 361¹, the circuit of coil 208ᵈ′ is involved.

I have explained above that the operations controlled and ordered by release mechanism A are immediately carried out by devices distinct from said mechanism and consisting of at least one servo-motor, for instance of the reciprocating motion type, which is operated through electrical, mechanical or other means, and for instance through the action of a fluid under pressure or at a pressure lower than atmospheric pressure. It is generally advantageous to be able to vary the rapidity with which the servo-motor, or servo-motors, is, or are, working. This is because the changing from one combination of gears to another combination can be performed very quickly if the speed of revolution of the engine is low while, on the contrary, it should be performed much more slowly if the engine is running at high speed, in view of the inertia of the parts.

Fig. 10 shows an arrangement which is particularly adapted to the case of a fluid operated servo-motor for which the rapidity with which it moves through its stroke for executing the desired operation of the mechanism with which it is associated depends, for a given work, merely of the size of the sections of flow afforded to the driving fluid. By throttling more or less the pipe 315 extending between the source of driving fluid and the servo-motor, it is possible to adjust at will the quickness of operation of the system. In this pipe 315, I provide a throttling organ, such as a slide valve 316, preferably balanced, and which may, eventually, be moved manually.

As the speeds of revolution of the engine at which gear changings take place are determined by the position occupied by pedal 48' or the equivalent means for controlling the carburetter throttle valve, it suffices to connect, through any suitable means, the displacements of slide valve 316 with those of roller 307 or the like, for obtaining a variation in the quickness of operation of the servo-motor, for instance as above explained.

In my prior application above mentioned, I disclosed an arrangement according to which a single servo-motor serves to operate the change speed box and to disengage the clutch beyond the position for which the separation of the friction discs is complete.

This arrangement has no disadvantage as far as the working of the system is concerned, but it calls for a uselessly exaggerated work of the servo-motor when the efforts to be developed are important because the supplementary stroke required from the clutch mechanism imposes a certain, and considerable, amount of work, which is added to that necessary for operating the gear box.

In this case, it is advantageous to employ the arrangement disclosed by Fig. 17, according to which the stroke of the element for operating the disengagement of the clutch is not prolonged beyond the position for which this disengagement is sufficient, the gear box being operated while the clutch control element is kept stationary in the position corresponding to a sufficient disengagement of the clutch. This result may be obtained by providing between the servo-motor and the mechanisms to be actuated, cams of any type whatever, of rectilinear or circular movement, which have, when in movement, active portions (inclined surfaces or the like) when they must transmit a movement and inactive or inoperative portions (circular, rectilinear or equivalent parts) for the periods during which the control organs are to be kept stationary.

Fig. 17 shows an arrangement of this kind in which a shaft 367 arranged to move together with the movable piston of the servo-motor 350″, of any reciprocating motion type, carries, for instance, two cams 368 and 369 acting respectively, through levers 370 and 78, on rods 68 and 372 intended to ensure the operation of the various parts of the transmission. As a rule, there are as many cams as there are parts to be operated.

Cam 368, which controls the operation of the clutch, for instance, acts, from the start, through an inclined portion, on the lever 370 which operates the rod 68 controlling the clutch device, so that this operation is the first to take place. On the contrary, during this time, the cam 369 which controls rod 372 for operating the gear box, is inoperative because of the substantially circular outline of the part thereof that is in operation. When the clutch is sufficiently disengaged, cam 368 ceases to operate the corresponding mechanism because its outline not in operation is substantially rectilinear, while the active portion of the outline of cam 369 is inclined, so as to be able to operate the gear box.

It should be noted that when a single servo-motor 350″ is employed, with which the first part of the stroke of the movable element (piston 351″) serves for the operation of the clutch, while the remainder of said stroke serves for the operation of the gear box, this servo-motor must be capable of working in two wholly different manners, according as whether it is intended to operate the clutch when the vehicle is starting (in which case the operation must be very sensitive since it is desired to couple an engine running at low speed with a vehicle which is wholly stopped), or it is intended to operate the clutch after changing gears, in which latter case the operation must take place much more quickly.

For this purpose, I arrange the distribution device 352″ in such manner that its movable valve 386 can occupy either of four well determined active positions, which are shown in Figs. 17, 18, 19 and 20, respectively. This distribution valve 386 is subjected to the action of two electro-magnetic devices 383¹ and 383² (which should not be considered as the equivalent of those designated by 208ᵈ and 208ᵐ in Fig. 11) each of which is capable of attracting the distribution valve toward one of the extreme positions of its stroke, while compressing a return spring 384¹ or 384². Between each end of the distribution valve 386 and the corresponding spring, there is provided a small plate 385¹ or 385² which can be stopped by a shoulder of the box 352″ of the distribution device. With this arrangement, the distributing valve 386 can fully compress its return spring, by being attracted by the corresponding electro-magnetic device, but this spring, when expanding can bring back this slide valve only to the immediately adjacent active position, which is fixed by the corresponding plate 385¹ or 385² being stopped by the corresponding shoulder of the casing (Figs. 17 and 20).

Coil 383¹ is intended, for instance, to produce the disengagement of the clutch when the gear combinations of the gear box are being changed. It is fed with current through the lever 21ᵃ′ pivoted at 521ᵃ′ of the gear box release device, whatever be the contact 23ᵐ or 23ᵈ upon which this lever is bearing. For this purpose, I provide, between the source of electricity 58 and lever 21ᵃ′, a thick wire winding 387 wound around a core, in such manner that the flow of current through either of the above mentioned contacts produces the displacement of a small plate 388 and the closing of a contact 390 through which the above mentioned plunger electro-magnet 383¹ is fed with current.

Coil 383² is intended to produce the operation proper of the clutch when the vehicle is being started or is being stopped and it is fed with current directly through the lever 21ᵇ″ pivoted at 521ᵇ″ of the clutch release device.

When the vehicle, which is supposed to be running, tends to stop, it is known, as explained in my prior application above mentioned, that as soon as the speed of revolution of the engine drops below a predetermined value, lever 21ᵇ″ always comes to touch contact 24ᵈ (Fig. 18), causing current to be fed to coil 383², which attracts the distribution slide valve 386, thus compressing spring 384². In this position, the slide valve permits the inflow of fluid (for instance oil) under pressure to the servo-motor through conduit 374, which produces the disengagement of the clutch. The sections of flow k¹, k², k³ of the fluid toward the servo-motor are chosen in such manner that the rapidity with which the operation is carried out is practically instantaneous.

When the vehicle must again start, the driver first accelerates the engine and there comes a time (Fig. 17) when, due to the increased speed of revolution of the engine, the lever 21ᵇ of the clutch release device leaves contact 24ᵈ, whereby coil 383² is no longer fed with current and spring 384² pushes slide valve 386 into the immediately adjacent position (Fig. 17), in which it ensures the exhaust, through k³, k², and k⁴, of the fluid that is present in the servo-motor. This operation must take place gradually and, for this reason, the section of flow k⁴ is calculated in such manner as to permit only a slow flow of the fluid whereby the servo-motor can operate but very gradually.

When changing from one gear to another one, either higher or lower, lever 21ᵃ′ is applied against contact 23ᵈ or 23ᵐ, which closes contact 390. The slide valve 386 is thus attracted by coil 383¹ until it is in the position shown by Fig. 19 for which oil under pressure is sent, through passages k¹, k⁵, and k³, to the servo-motor, the operation being carried out quickly.

When lever 21ᵃ′ leaves contact 23ᵈ (or 23ᵐ) current ceases to be fed to coil 383¹ and slide valve 386, pushed back by its spring 384¹, comes into the position shown by Fig. 20. However, this position is different from that which produces the gradual letting in of the clutch and oil coming from the servo-motor can flow quickly through passages of large section k³, k⁵, k⁶, and k¹ and through conduit 377′ to the reservoir 375′. In this way, a quick letting in of the clutch is obtained.

In some cases, it may be preferable to make use of two servo-motors B and E, as shown in Figs. 21 and 22. Servo-motor B then serves for the operation of the clutch control element 68ᵉ, the removable pedal 76 of the clutch being shown in dotted lines for illustrative purposes. Servo-motor E' serves for the operation of the gear box, which is set forth in the drawings, by indicating in dotted lines the removable lever 89 for the operation of said gear box.

With this arrangement, the precautions concerning the two different manners of letting in the clutch, as above stated, must be applied to servo-motor B.

Furthermore, servo-motor E must be capable of working only when the clutch has been fully disengaged which may be obtained by providing in conduit 363 for the inflow of fluid under pressure a valve 391 which is normally closed and which is opened by an element, driven by servo-motor B (cam 392 in Fig. 21 or piston rod 392ᵃ of the servo-motor, arranged to act as an oil distribution member, in Fig. 22) when the clutch has been fully disengaged.

It should be noted that the solution which consists in making use of a servo-motor B for the clutch 3 and another servo-motor E' for the gear box 4 may be considerably simplified by making use of an electromagnetic clutch the coil of which, controlled by a mere circuit-breaker, constitutes the first servo-motor B, without requiring the action of any other driving organ for operating it. In this case, the contact of the clutch release device, which directly feeds current to said coil, is arranged on the opposite side, with respect to lever 21ᵇ, from that on which is located contact 24ᵈ in Figs. 8 and 9.

With this arrangement, as soon as the speed of revolution of the engine becomes sufficient, the contact is closed and current is fed to the electromagnetic clutch, which is let in and causes the vehicle to be driven. On the contrary, if the engine slows down, the contact opens and the clutch releases the shafts it coupled together.

Instead of making use of a shaft 81 with cams such as 4ᵃ, 4ᵇ and 4ᶜ for operating the gear box, I may also make use, as shown by Fig. 23, of a disc 19, keyed on shaft 81 and provided with grooves 4ᵃ', 4ᵇ' and 4ᵈ which control, for instance through rods 14ᵃ, 14ᵇ and 14ᵈ and forked levers 4ˣ' and 4ʸ', gears of the gear box. The control of the servo-motor is ensured parallelly: (1) by an operating handle or the like 96 through which the driver can obtain, at will, either a gear combination corresponding to the vehicle running in the forward direction (av), or reverse gear (ar), or again neutral gear (pm); (2) by the gear box release device 21ᵃ''; and (3) by a rotary distribution disc 98, carried by shaft 81 which drives plate 19.

Shaft 81 is driven, not by a rotary servo-motor but by a reciprocating motion servo-motor 350'', for instance operated by a fluid under pressure, as in the preceding embodiments.

In this case, shaft 81 is driven through any coupling means capable of transforming a rectilinear movement into a circular movement, and, for instance, through a pinion 430, keyed on shaft 81 and constantly in mesh with a rack 431 carried by the rod 353''' of the servo-motor. For a full stroke of the piston of the servo-motor, shaft 81 moves in such manner as to cause changing from an extreme combination for instance reverse gear) to the other extreme combination for instance direct drive when running in the forward direction).

The distribution member 352''' of the servo-motor still has three positions. For one of these positions (one of its extreme positions), when it is attracted by a coil 208ᵐ''', fed through contacts 23ᵐ' and ᵐ², it brings one of the faces of the piston into communication with the inlet conduit 315 and the other face of the piston into communication with the fluid exhaust conduit 377, so that piston 351''' is moved into a position corresponding to higher gear combinations, for instance from combination II to combination III. In the mean or intermediate position, the distributing member 352''' closes both of conduits 315 and 377, which stops the piston. In the other extreme position, distribution member 352''' produces a displacement of the piston for which shaft 81 turns in the opposite direction, corresponding to changing to lower gear combinations.

For reverse gear, operating handle 96 is set onto contact ar which, through the electricity conducting studs or keys of distributing disc 98, feeds current to coil 208ᵈ'' of the servo-motor, until shaft 81 occupies the desired position. In this position, the current feed from source 58 is automatically cut off by the distributing disc.

For obtaining neutral gear, the driver sets the operating handle 96 onto contact pm, which brings shaft 81 into the corresponding position and for the automatic working when running in the forward direction, handle 96 is placed onto contact av, thus feeding current to the lever 21ᵃ of the release device, the latter then ensuring the feed of current to the various contacts for supplying fluid to the servo-motor.

The mechanisms shown by Figs. 23 and 24 may, of course, include all safety and manual operation devices as may be desired, for use in case of breakdown of the automatic system above described.

In Fig. 25, I have shown another arrangement with a servo-motor 350ᴵⱽ of the piston type but which, instead of providing all the different working combinations of gears for a single stroke of the piston, permits the piston to move through a full stroke for driving shaft 81 from a characteristic position into the next characteristic position. In this case, shaft 81 is preferably provided with a driving mechanism including two ratchet wheels 205' and 206', such as correspond to the ratchet wheel of Figs. 10 and 11, with, if necessary, the safety devices already described for the recording of the order transmitted by the lever 21ᵃ'' of the release device. In this case, the distributing element 352ᴵⱽ of the servo-motor 350ᴵⱽ is actuated by piston 351ᴵⱽ or by one of the parts that move together with it, for instance by a heel 402 provided on sliding plate 200 which carries the pawls. This heel cooperates with two projections provided on distributing element 352ᴵⱽ in such manner as to bring said element, when the piston reaches the end of its stroke, into a position corresponding to the reversing of the movement of the piston.

If the distribution device were used alone, the servo-motor would therefore start back into the opposite direction, which would correspond to a continuous reciprocating movement of the servo-motor. In order to limit to a minimum the time of use of the servo-motor, I may add to distributing element 352ᴵⱽ a second distributing element 403 which is controlled by an electromagnetic device 404. The energizing of the coil of device 404 is obtained through one or the other of contacts 23ᴹ and 23ᴰ cooperating with the safety element 340. The second distributing device 403 permits the movement of the servo-motor 350 every time the coil 404 thereof is energized, then occupying a position for which fluid is admitted through conduit 315. It results from the preceding explanations that when the operations for passing from one combination of gears to another combination are finished, the oscillating piece 201'' and, together with it, the safety element 340 come back into their intermediate position, which cuts off the energizing of coil 404, whereby distributing member 403 comes back into its initial position, in which it stops the inlet conduit 315 and opens the exhaust conduit 377, thus stopping the operation of servo-motor 350$^{IV}$. It follows that said servo-motor can operate only when allowed to do so by distributing element 403, that is to say just for the time necessary for performing the operation required by the release device.

I may subject distributing element 403, or element 340, to the action of a device permitting to determine, under the best conditions, the time within which the operation must be carried out. This result may be obtained through a braking or retarding device 405, such as a dash-pot or any other mechanism giving a similar result. The successive strokes of servo-motor 350$^{IV}$ are thus separated by well determined time intervals which is favorable to the comfort of the persons present in the vehicle and also avoids confusion in the orders transmitted by the release device.

I might obtain an analogous result if, instead of a second distributing element 403, I employed a servo-motor 350$^{IV}$ having a double acting piston and a return spring, the heel 402 then acting on the distribution device 352$^{IV}$ merely for stopping the inlet.

Finally, when I make use, for controlling the clutch, of a servo-motor distinct from servo-motor 350$^{IV}$ (E), as explained with reference to Fig. 22, I may obtain that servo-motor 350$^{IV}$ starts into operation only when servo-motor B has produced the disengagement of the clutch. For this purpose, I may provide, on distributing device 352$^{IV}$ an electric contact which, when heel 402 reaches its upper stop, starts servo-motor B for letting in the clutch and which, when the piston 351$^{IV}$ of servo-motor 350$^{IV}$ has come back to the lower end of its stroke, intervenes for cutting off the feed of driving fluid.

In Fig. 26, I have shown another arrangement of the same kind in which I provide, for the arm 96$^a$, which is rigid with the operating handle 96, as many contacts, such as $ar$, $pm$, I, II, III and IV, as there exist working combinations. The driver acts, for instance, on handle 96 for non-automatic combinations, that is to say from $pm$ to $ar$, from $ar$ and $pm$ to I, the working being automatic beyond I toward IV and from IV toward $pm$.

The lever 21$^a$ of the release device produces the rotation of the shaft 406 of handle 96, by feeding one or the other of the electromagnetic suction devices 407$^m$ and 407$^d$ the core 200$^a$ of which (which plays the same part as the sliding piece 200 of the embodiment of Figs. 10 and 11) carries pawls 205$^{d'}$ and 206$^{m'}$ which cooperate with ratchet wheels 205' and 206', as above described. When coil 407$^m$, for instance, is fed with current, pawl 206$^{m'}$ causes ratchet wheel 206' to turn forward through an angle corresponding to one tooth, which drives shaft 406 in the same direction and brings arm 96$^a$ onto the higher contact, for instance III when coming from II. As pawl 205$^{d'}$ was moved away from wheel 205', it remains inoperative. The contrary takes place when electro-magnet 407$^d$ is fed with current.

On shaft 406 I may also fit the cam wheel 331' (Figs. 12 and 13) with its retarding device 328, the arm 408 of which carries a circuit breaker 409 intended to feed current, in shunt to an auxiliary contact for confirming the order given by lever 21$^{a''}$. This operation is obtained owing to the fact that, as soon as arm 96 leaves one of the contacts and as long as it has not come onto the next contact, contact 409 remains closed. Furthermore, I provide, on core 200$^a$, cooperating with coils 407$^d$ and 407$^m$, a rack 430 meshing with a pinion 431, the spindle 414 of which carries a finger 412 cooperating with two contacts 23$^{M'}$ and 23$^{D'}$ which constitute the auxiliary contact above referred to. The rotation of spindle 414 brings finger 412 into engagement with one of said contacts, according to the direction of movement of core 200$^a$. In this way, current is fed through contact 409 and arm 412 to coil 407$^m$ or 407$^d$ in shunt with the feed through the lever 21$^{a''}$ of the release device. The feed through this lever 21$^{a''}$ may be cut off if so desired, as soon as core 200$^a$ leaves its inoperative neutral position for carrying out the order that has been received because, at this time, a finger 413, also carried by spindle 414 and connected to source 58, leaves its contact connected to lever 21$^{a''}$.

I may also provide, on shaft 414, an escape wheel 415, analogous to those employed in clockwork mechanisms, this wheel cooperating with an anchor 416 rigid with an oscillating mass 417. The rate at which the automatic movements produced by the movement of core 200$^a$ can thus be adjusted at will. It should be noted here that shaft 414 has been provided merely for the sake of simplicity. As a matter of fact, the organs carried by said shaft might quite as well be mounted directly on core 200$^a$ or on a prolonged part thereof. The displacements would then become rectilinear instead of being circular, without modifying the operation of the device.

When the gear box is devised in such manner that each working combination is obtained through an electromagnetic clutch or brake, fed directly through a contact such as II, the device as above described is sufficient in itself. It suffices to connect contacts $ar$, $pm$, I, II, III, IV to the coils which set into operation the various gear combinations.

On the contrary, in the case of a mechanical gear box, of the type, for instance, of that shown by Fig. 10, I may make use, as in the preceding embodiments, of a shaft 81, with a distributing disc 98, driving a grooved disc 19 (Fig. 23) or cams such as 4$^a$ and 4$^b$ (Figs. 24 to 26).

In order to drive rotary shaft 81 through servo-motor 350$^v$, in the case of the arrangement according to Fig. 26, I have provided a modification of the means for transforming the reciprocating movements of the piston of the servo-motor into a rotary movement of shaft 81. According to this modification, shaft 81 is prolonged by a screw 418, of large pitch. On this screw is engaged a nut 419, which cannot turn about its axis, being for instance held in fixed angular position by a lug 420, arranged to slide along a rod 421, parallel to screw 418, said nut moving together with the piston of the servo-motor. When one of the coils 208$^{m''}$ or 208$^{d''}$ of the distributing device 352 of said servo-motor is fed with current through distributing disc 98, the piston causes nut 419 to move forward or backward. Owing to the large pitch of the screw on which said nut is engaged, this movement is transformed into a rotary movement of shaft 81.

I thus obtain an operation analogous to that of the devices above described.

It should be noted that shaft 406 plays the part of a distribution device at the start of an operation, by sending the driving fluid (in this case electricity) every time an operation is required, while disc 98 plays the part of a distribution device for the end of the operation, being carried by the shaft 81 which performs the operation in such manner as to cut off the flow of the driving fluid as soon as the operation is performed. This system therefore complies exactly to the requirements above stated with reference to the mechanical gear box.

Furthermore, it is by no means necessary, as in the example cited, in order to obtain the coupling of the two distributing devices 96ª and 98, to make use of a fluid (electricity) different from that (oil under pressure for instance) employed for the operation of servo-motor 350ᵛ. Such a solution has been adopted in the example illustrated by Fig. 26 chiefly because electricity is advantageously employed for controlling parts from a distance. But if shaft 406 can be disposed in close proximity to shaft 81, there would be no objection to replacing the electric connections which extend between distributing device 86ª and distributing device 98 by conduits for the fluid that is utilized in the servo-motor, distributing devices 96ª and 98 being then made of a structure corresponding to the use of said fluid.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In combination, in a vehicle having an engine and a variable speed transmission connected therewith, means for controlling said transmission, a member operatively connected to said last means to regulate the same, means controlled in dependence on the speed of some moving part of the vehicle which varies during the operation of the vehicle to affect said transmission controlling means, means for supplying fuel to the engine, a single element for controlling both said fuel supply means and said member, and means connecting said fuel supply means and said member to said control element to impart motion from the control element thereto, said last means upon movement in one direction operating said fuel supply means and said member during different parts of its movement, and upon movement in the opposite direction operating said fuel supply means and member in the other direction during different parts of its movement but in the same order.

2. In a device as claimed in claim 1, said last means upon movement in each direction operating first the fuel supply means and then said member.

3. In a device as claimed in claim 1, said connecting means including operating members operatively connected to said fuel supply means and said member, means operatively connecting said operating members to said control element, and means for braking the movement of said first member.

4. In a device as claimed in claim 1, said connecting means including operating members operatively connected to said fuel supply means and said member, means operatively connecting said operating members to said control element, means for braking the movement of said first member, and a yielding connection between the other operating member and the fuel supply means.

5. In combination, in a vehicle having an engine and a variable speed transmission connected therewith, means for controlling said transmission including a member operatively connected to said last means to regulate the same, means controlled in dependence on the speed of some moving part of the vehicle which varies during the operation of the vehicle to affect said transmission controlling means, means for exerting an opposing force on said speed controlled means, at least one stop for limiting the displacement of said member, and means to adjust the position of said stop.

6. In combination, in a vehicle having an engine and a variable speed transmission connected therewith, means for controlling said transmission, a member operatively connected to said last means to regulate the same, means controlled in dependence on the speed of some moving part of the vehicle which varies during the operation of the vehicle to affect said transmission controlling means, means for exerting an opposing force on said speed controlled means and means interposed between said transmission controlling means and said speed controlled means to vary the effect produced by said last means on said first means, said varying device including means to produce both a uniform varying effect and an effect proportional to the forces exerted by said speed controlled means.

7. In combination, in a vehicle having an engine and a variable speed transmission connected therewith, means for controlling said transmission, a member operatively connected to said last means to regulate the same, means controlled in dependence on the speed of some moving part of the vehicle which varies during the operation of the vehicle to affect said transmission controlling means, a fluid operated servo-motor for operating said transmission, a conduit for feeding fluid to said servo-motor, means for adjusting the action of said member so as to vary the effect of said speed controlled means, and means operative by said last means for variably throttling said conduit so as to vary the speed of operation of said servo-motor in accordance with variations in the operating conditions of said speed controlled means.

8. In combination, in a vehicle having an engine and a variable speed transmission connected therewith, means for controlling said transmission including a control member, means controlled in dependence on the speed of some moving part of the vehicle which varies during the operation of the vehicle to affect said control member, a servo-motor for operating said transmission, control means for said servo-motor controlled by said control member, means operatively interconnected with said control means, and means for locking said last means when said servo-motor is operated under the control of said control member, and for releasing said locking means after completion of the operation.

9. In a device as claimed in claim 8, means for transmitting to said control member the movement of said servo-motor.

10. In combination, in a vehicle having an engine and a variable speed transmission connected therewith, automatic means for controlling said transmission including a control member, means controlled in dependence on the speed of some moving part of the vehicle which varies during the operation of the vehicle to affect said control member, a servo-motor for operating said transmission, control means for said servo-motor operative by said control member, and means for transmitting the motion of said servo-motor to said transmission including a movable member, means provided with oppositely directed ratchet teeth mounted on said movable member, pawls adapted to cooperate with said ratchet teeth, and means for selectively causing said pawls to engage said ratchet teeth to shift said movable member in opposite directions upon operation of said servo-motor.

11. In combination, in a vehicle having an engine and a variable speed transmission connected therewith, automatic means for controlling said transmission including a control member, means controlled in dependence on the speed of some moving part of the vehicle which varies during the operation of the vehicle to affect said control member, a servo-motor for operating said transmission, control means for said servo-motor operative by said control member, means for transmitting the motion of said servo-motor to said transmission including a rotatable member, said rotatable member having means thereon providing oppositely directed ratchet teeth, a slidably mounted member, means operatively connecting said slidably mounted member to said servo-motor to be moved thereby, pawls mounted on said slidably mounted member, and means for selectively engaging said pawls with said ratchet teeth to turn said rotatable member in opposite directions upon operation of said servo-motor.

12. In combination, in a vehicle having an engine and a variable speed transmission connected therewith, automatic means for controlling said transmission including a control member, means controlled in dependence on the speed of some moving part of the vehicle which varies during the operation of the vehicle to affect said control member, means for exerting an opposing force on said control member, a servo-motor for operating said transmission, control means for said servo-motor operative by said control member, means for transmitting the motion of said servo-motor to said transmission including a rotatable member, said rotatable member having means thereon providing oppositely directed ratchet teeth, a slidably mounted member, means operatively connecting said slidably mounted member to said servo-motor to be moved thereby, pawls mounted on said slidably mounted member, said slidably mounted member being mounted for rocking movement, and means controlled by said control member to rock said slidably mounted member, whereby one or the other of said pawls engages said ratchet teeth to rock said rotatable member in opposite directions when said servo-motor is operated.

13. In combination, in a vehicle having an engine and a variable speed transmission connected therewith, automatic means for controlling said transmission including a control member, means controlled in dependence on the speed of some moving part of the vehicle which varies during the operation of the vehicle to affect said control member, means for exerting an opposing force on said control member, a servo-motor for operating said transmission, control means for said servo-motor operative by said control member, means for transmitting the motion of said servo-motor to said transmission including a rotatable member, two coaxial ratchet wheels mounted on said rotatable member and having their teeth arranged in opposite directions, two pawls adapted to engage said ratchet wheels, means connected to said servo-motor to move said pawls, and means controlled by said control element for preventing the engagement of one of said pawls with said ratchet teeth.

14. In combination, in a vehicle having an engine and a variable speed transmission connected therewith, automatic means for controlling said transmission including a control member, means controlled in dependence on the speed of some moving part of the vehicle which varies during the operation of the vehicle to affect said control member, a fluid operated servo-motor for operating said transmission, and a fluid distributing device connected to said servo-motor for supplying fluid thereto and controlled by said control member, said distributing device including means for causing said servo-motor to operate at different rates of speed.

15. In combination, in a vehicle having an engine and a variable speed transmission and a clutch mechanism connected therewith, automatic means for controlling said transmission and clutch mechanism including control elements for said transmission and clutch mechanism, means controlled in dependence on the speed of some moving part of the vehicle which varies during the operation of the vehicle to move said control elements, a servo-motor for operating said transmission, a servo-motor for operating said clutch, control means for said servo-motors operated by said control elements, and means interconnecting said control means so as to prevent the operation of the transmission servo-motor until the clutch has been disengaged by its servo-motor.

16. In combination, in a vehicle having an engine and a variable speed transmission and a clutch mechanism connected therewith, automatic means for controlling said transmission and clutch mechanism including control elements for said transmission and clutch mechanism, means controlled in dependence on the speed of some moving part of the vehicle which varies during the operation of the vehicle to move said control elements, a servo-motor for operating said clutch, means actuated by said clutch control element to control the operation of said servo-motor, a second servo-motor, means controlled by said transmission control element to control said second servo-motor, and means operated by said second servo-motor for operating both said clutch and said transmission.

17. In combination, in a vehicle having an engine, a variable speed transmission and a clutch mechanism connected therewith, automatic means for controlling said transmission and said clutch mechanism and including two parts one comprising a control member for said transmission and the other comprising an element operatively connected to said clutch mechanism to control the same, and means to control the positions of said parts, said last means including means controlled in dependence on the speed of some moving part which varies during the operation of the vehicle to exert a force on said clutch control element, means for exerting an opposing force which tends to move said transmission control member, means interposed between said parts to transmit said force and said opposing force from one part to the other, and a second means for exerting a force on said clutch control element in a direction to oppose said first force, said second means being substantially inoperative to move said transmission control member.

18. In combination, in a vehicle having an engine, a variable speed transmission and a clutch mechanism connected therewith, automatic means for controlling said transmission and said clutch mechanism and including two parts one comprising a control member for said transmission and the other comprising an element operatively connected to said clutch mechanism to control the same, and means to control the positions of said parts, said last means including means controlled in dependence on the speed of some moving part which varies during the operation of the vehicle to exert a force on said clutch control element, means for exerting an opposing force which tends to move said transmission control member, means interposed between said parts to transmit said force and said opposing force from one part to the other, and a second means for exerting a force on said clutch control element in a direction to oppose said first force, said second means being substantially inoperative to move said transmission control member, said last means comprising a spring arranged in said force transmitting means.

19. In combination, in a vehicle having an engine, a variable speed transmission and a clutch mechanism connected therewith, automatic means for controlling said transmission and said clutch mechanism and including two parts one comprising a control member for said transmission and the other comprising an element operatively connected to said clutch mechanism to control the same, and means to control the positions of said parts, said last means including means controlled in dependence on the speed of some moving part which varies during the operation of the vehicle to exert a force on said clutch control element, means for exerting an opposing force which tends to move said transmission control member, means interposed between said parts to transmit said force and said opposing force from one part to the other, and a second means for exerting a force on said clutch control element in a direction to oppose said first force, said second means being substantially inoperative to move said transmission control member, said last means comprising a spring arranged in said force transmitting means, and said force transmitting means including rigid means engageable when the force of said spring is overcome to transmit said first force and opposing force.

20. In combination, in a vehicle having an engine, a variable speed transmission and a clutch mechanism connected therewith, automatic means for controlling said transmission and said cutch mechanism and including two parts one comprising a control member for said transmission and the other comprising an element operatively connected to said clutch mechanism to control the same, and means to control the positions of said parts, said last means including means controlled in dependence on the speed of some moving part which varies during the operation of the vehicle to exert a force on said clutch control element, means for exerting an opposing force which tends to move said transmission control member, means interposed between said parts to transmit said force and said opposing force from one part to the other, said force transmitting means including a lever having a notch therein, a member engaged in said notch, and a spring acting on said last member so as to tend to hold said lever in its mean position.

21. In combination, in a vehicle having an engine, a variable speed transmission and a clutch mechanism connected therewith, automatic means for controlling said transmission and said clutch mechanism and including two parts one comprising a control member for said transmission and the other comprising an element operatively connected to said clutch mechanism to control the same, and means to control the positions of said parts, said last means including means controlled in dependence on the speed of some moving part which varies during the operation of the vehicle to exert a force on said clutch control element, means for exerting an opposing force which tends to move said transmission control member, means interposed between said parts to transmit said force and said opposing force from one part to the other, said last means including a pair of levers operatively connected to said parts respectively, said levers being pivoted at opposite ends and overlapping each other at their free ends, whereby the point of engagement between said levers varies as the levers turn.

22. In combination, in a vehicle having an engine, a variable speed transmission and a clutch mechanism connected therewith, automatic means for controlling said transmission and said clutch mechanism and including two parts one comprising a control member for said transmission and the other comprising an element operatively connected to said clutch mechanism to control the same, and means to control the positions of said parts, said last means including means controlled in dependence on the speed of some moving part which varies during the operation of the vehicle to exert a force on said clutch control element, means for exerting an opposing force which tends to move said transmission control member, means interposed between said parts to transmit said force and said opposing force from one part to the other, said last means comprising levers operatively connected to said parts respectively, a rolling member between and engaging said levers, and means to vary the position of said rolling member.

23. In combination, in a vehicle having an engine, a variable speed transmission and a clutch mechanism connected therewith, automatic means for controlling said transmission and said clutch mechanism and including two parts one comprising a control member for said transmission and the other comprising an element operatively connected to said clutch mechanism to control the same, and means to control the positions of said parts, said last means including means controlled in dependence on the speed of some moving part which varies during the operation of the vehicle to exert a force on said clutch control element, means for exerting an opposing force which tends to move said transmission control member, means interposed between said parts to transmit said force and said opposing force from one part to the other, said last means comprising levers operatively connected to said parts respectively, two rolling members between and engaging said levers, and means for independently varying the positions of said rolling members.

24. In combination, in a vehicle having an engine, a variable speed transmission and a clutch mechanism connected therewith, automatic means for controlling said transmission and said clutch mechanism and including two parts one comprising a control member for said transmission and the other comprising an element operatively connected to said clutch mechanism to control the same, and means to control the positions of said parts, said last means including means controlled in dependence on the speed of some moving part which varies during the operation of the vehicle to exert a force on said clutch control element, means for exerting an opposing force which tends to move said transmission control member, means interposed between said parts to transmit said force and said opposing force from one part to the other, said last means comprising levers operatively connected to said parts respectively, a rolling member between and engaging said levers, and means to vary the position of said rolling member, and means controlled by the load on the engine to control said last means.

25. In combination, in a vehicle having an engine, a variable speed transmission and a clutch mechanism connected therewith, automatic means for controlling said transmission and said clutch mechanism and including two parts one comprising a control member for said transmission and the other comprising an element operatively connected to said clutch mechanism to control the same, and means to control the positions of said parts, said last means including means controlled in dependence on the speed of some moving part which varies during the operation of the vehicle to exert a force on said clutch control element, means for exerting an opposing force which tends to move said transmission control member, means interposed between said parts to transmit said force and said opposing force from one part to the other, said last means comprising levers operatively connected to said parts respectively, a rolling member between and engaging said levers, and means to vary the position of said rolling member, a fuel feed control member for said engine, and means operatively connected thereto to control said last means.

26. In combination, in a vehicle having an engine and a variable speed transmission and a clutch mechanism connected therewith, means for controlling said transmission and clutch mechanism including control elements for said transmission and clutch mechanism, means controlled in dependence on the speed of some moving part of the vehicle which varies during the operation of the vehicle to move said control elements, means controlled by said transmission control element for operating said transmission, means controlled by said clutch control element for operating said clutch, said clutch mechanism and control element including an electric circuit having two parallel branches, means operatively connected to said clutch control member for closing a circuit through one of said branches, relay means to close a circuit through the other branch, and means operatively connected to said transmission control member in its position corresponding to the lowest speed of the engine to energize said relay, so that said clutch is maintained engaged until said transmission control member moves away from such position.

27. In combination, in a vehicle having an engine and a variable speed transmission and a clutch mechanism connected therewith, means for controlling said transmission and clutch mechanism including control elements for said transmission and clutch mechanism, means controlled in dependence on the speed of some moving part of the vehicle which varies during the operation of the vehicle to move said control elements, means controlled by said transmission control element for operating said transmission, means controlled by said clutch control element for operating said clutch, said transmission control means including an electric circuit, means in said circuit to cause shifting to a lower gear, and means controlled by movement of said clutch control member to clutch disengaging position to energize said circuit.

28. In combination, in a vehicle having an engine and a variable speed transmission and a clutch mechanism connected therewith, means for controlling said transmission and clutch mechanism including control elements for said transmission and a clutch mechanism, means controlled in dependence on the speed of some moving part of the vehicle which varies during the operation of the vehicle to move said control elements, means controlled by said transmission control element for operating said transmission, means controlled by said clutch control element for operating said clutch, said transmission control means including an electric circuit, means in said circuit to cause shifting to a lower gear, and means controlled by movement of said clutch control member to clutch disengaging position to energize said circuit, said last means including a switch in said circuit and a relay controlled by said clutch control member to operate said switch.

GASTON FLEISCHEL.